Figure 2:
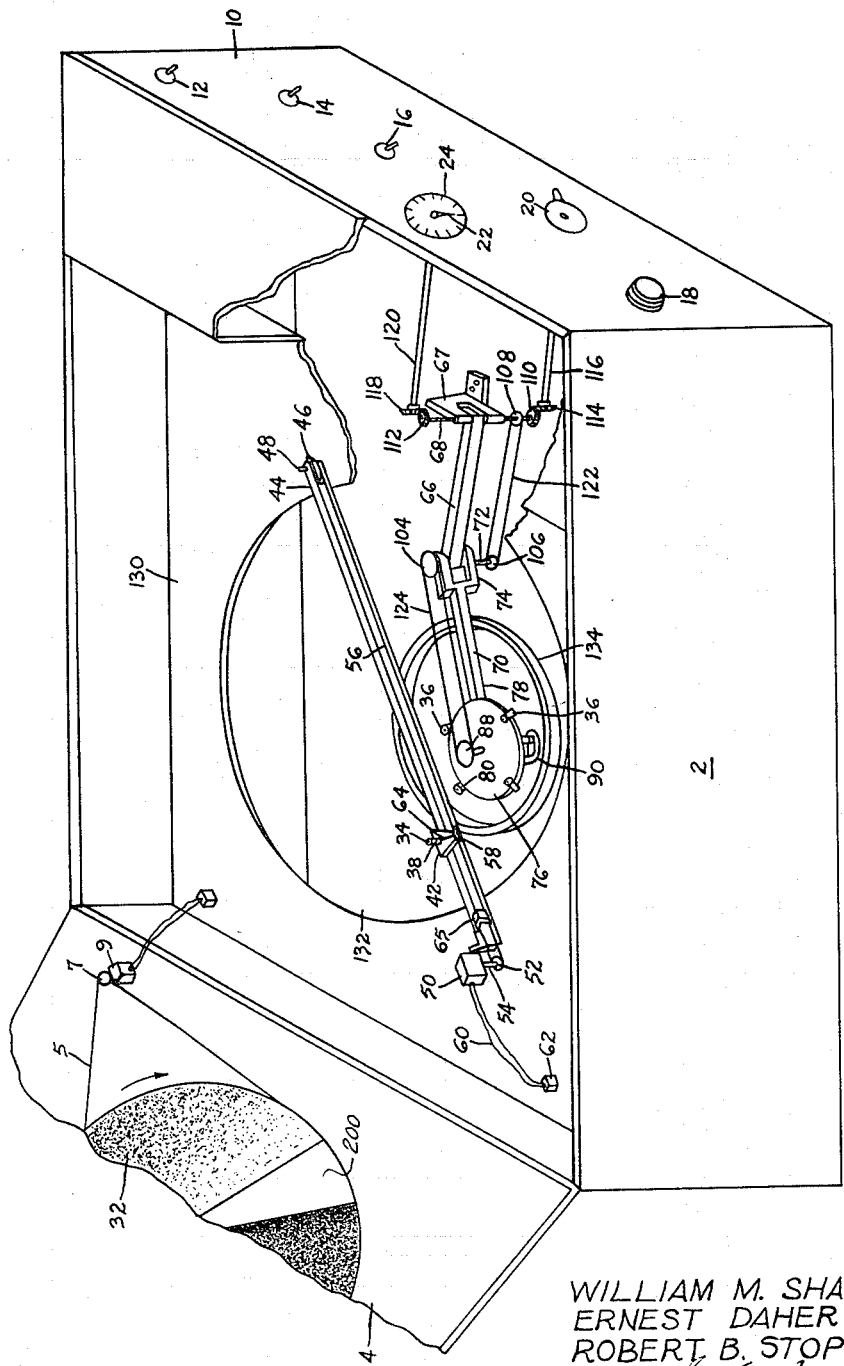

Dec. 16, 1958  W. M. SHANHOUSE ET AL  2,864,177
RELATIVE MOTION INTERCEPT TRAINER
Filed Dec. 22, 1953  2 Sheets-Sheet 1
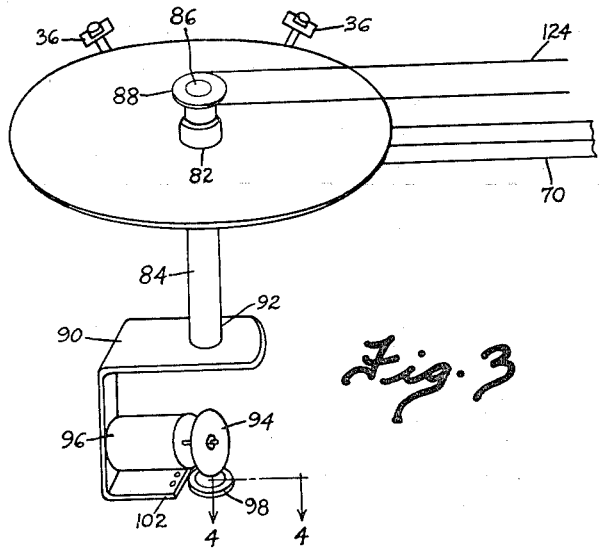
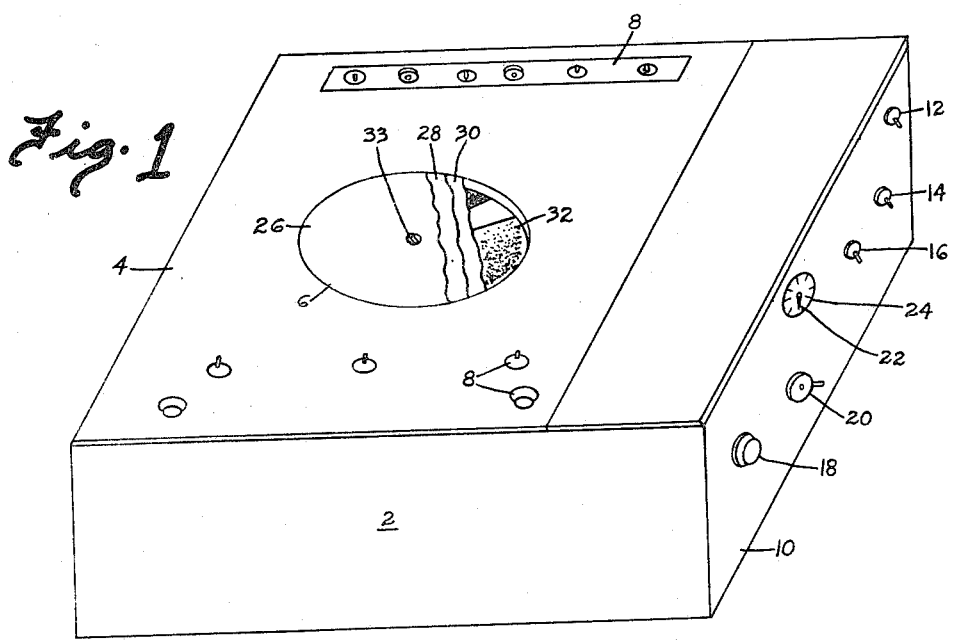
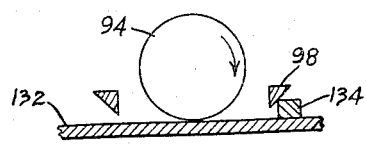
INVENTORS
WILLIAM M. SHANHOUSE
ERNEST DAHER
ROBERT B. STOPP
BY
ATTORNEYS

INVENTORS
WILLIAM M. SHANHOUSE
ERNEST DAHER
ROBERT B. STOPP
BY
ATTORNEYS

2,864,177
RELATIVE MOTION INTERCEPT TRAINER

William M. Shanhouse, Roslyn Heights, Ernest Daher, Babylon, and Robert B. Stopp, Flushing, N. Y., assignors to the United States of America as represented by the Secretary of the Navy Application December 22, 1953, Serial No. 399,848

1 Claim. (Cl. 35—10.2)

(Granted under Title 35, U. S. Code (1952), sec. 266)

The invention described herein may be manufactured and used by or for the Government of the United States of America for governmental purposes without the payment of any royalties thereon or therefor.

The present invention relates in general to a navigational training aid and more specifically to a device that simulates and illustrates the relative position and movement of a plurality of vehicles with respect to each other.

When using echo-seeking equipment, such as radar or sonar, to indicate the relative position between two vehicles, it becomes extremely expensive and impractical to use a plurality of vehicles such as ships or airplanes and actual echo-seeking equipment such as a radar or sonar unit to locate and illustrate their relative position. Another disadvantage to the use of actual equipment for training purposes is the limited number of hours that said equipment can be used because of inclement weather conditions or the need for said equipment in other locations.

Thus it is a practical necessity to employ and utilize a simulator that will generate and illustrate, in a realistic manner, the movement of a plurality of vehicles relative to each other. It is also necessary that said simulator be accurate and realistic in representing the positions of said vehicles and that the unit be portable so that it may be used at a training station.

The present invention is a device that simulates the relative positions and movements of a plurality of vehicles simultaneously. Each vehicle appears as a small spot of light on a screen that resembles a radar or sonar unit screen. One light spot represents a vehicle that moves along a preset course at a predetermined rate of speed. The other spot of light indicates the position of a second vehicle that travels at a preset rate of speed along a course that is controlled by the trainee. The trainee must determine the course and speed of the first mentioned vehicle and then correct and adjust the course of the second mentioned vehicle to intercept said first mentioned vehicle at some predetermined location.

An object of the present invention is to provide an electro-mechanical device that teaches a student intercept techniques by the utilization of simulated echo-seeking equipment.

It is another object of this invention to demonstrate the relative position and movement of two vehicles with respect to each other.

It is an additional object to provide a device that illustrates the relative courses and speeds of vehicles.

Another object is to demonstrate, on a simulated echo-seeking unit screen, the course and speed of an externally controllable vehicle with respect to a second vehicle.

Other objects and many of the attendant advantages of this invention will be readily appreciated as the same becomes better understood by reference to the following detailed description when considered in connection with the accompanying drawings wherein:

Fig. 1 is a perspective view of the invention in the operating position,

Fig. 2 is a perspective view of the interior of the present invention with parts broken away to show certain details, Fig. 3 is an enlarged view of the drive and indicator mechanism of the "own vehicle" reproducer wherein two of the light envelopes have been deleted for clarity, and Fig. 4 is a sectional view along the line 4—4 of Fig. 3, but with additional parts added to show certain operating conditions.

Referring to Fig. 1, therein is shown a perspective view of this invention as it appears during a demonstration. The top 4 of the box 2 contains a circular opening 6 and a photographic reproduction 8 of the controls that appear on the face of a typical radar unit. The top 4 swings upwardly and away from the box 2 on a hinge that is not illustrated.

Access to the equipment that is located within the interior of the box is accomplished by opening the top 4. Located on a vertical end or side portion 10 of the box 2 there are the various controls that are necessary to operate this device. On said side 10 there are three switches. One switch 12 controls the flow of current to the device, a second switch 14 controls the motion and position indication light of the target vehicle and the third switch 16 controls the position indication light of the "own" vehicle. A knob 18 that controls the intensity of the position indication lights and a knob 20 that controls the course of the "own" vehicle are also located on the panel 10. A pointer or indicator 22 assumes a position on the dial 24 that corresponds to the instantaneous "own vehicle" course.

Located within the opening 6 of the top 4 there are a plurality of light transmitting disks. The diameter of the disks is equal to the diameter of the screen of a typical radar unit. The first disk 26 as viewed from the face of the unit is clear. This disk is utilized in the making of notations and drawing lines to indicate the position of the target vehicle and the "own" vehicle for the purposes of computations. A second disk 28 that is located immediately below the first disk 26, is composed of a clear transparent material such as glass or plastic. Disk 28 contains a compass rose that is engraved upon its face. A third disk 30 is located immediately below the second disk 28 and said disk is composed of a light tranmitting and diffusing material. The disk 30 can be made of frosted glass on plastic.

The disks 26, 28 and 30 are securely mounted within the circular opening 6 of the top 4 and always remain stationary. Another disk 32 is rotatably mounted beneath the previously mentioned stationary disks. Disk 32 is rotated about the bearing 33 by means of a motor and a belt drive. Referring to Fig. 2, a V-shaped groove is cut into the periphery of disk 32 to accommodate a small diameter belt 5. The belt is driven by a small diameter V grooved pulley 7 that is connected to and driven by motor 9 that is mounted by any convenient means on the cover 4.

The disk 32 is rotated at a speed of six revolutions per minute. This rotational speed is identical to the rotational sweep speed of a radar screen. The rotating plastic disk 32 has a clear segment 200 of approximately twenty-five degrees. The remaining segment of the disk 32 is shaded, the density of said shading increasing in a uniform manner as the angular displacement from the clear sector is increased in a direction that is opposite to the direction of rotation.

The effect of the multiplicity of disks 26, 28, 30 and 32 is the accurate reproduction and simulation of images as they appear on a radar screen.

Referring again to Fig. 2, therein is illustrated the interior of the present invention. Internally this invention is equipped with two separate and distinct light sources.

One light source represents the target vehicle position and the other light source represents the "own vehicle" position. The movement of each light source is controlled by a separate system.

The target position indicator 34 consists of a light source that is not shown, within an envelope 38 that contains a pin hole that directs a fine beam of light in an upward direction. The light source and the envelope 38 are mounted on a carriage 42 that is slidably mounted to the supporting member or track 44. Said member 44 is composed of any rigid electrical conducting material such as brass or steel. Mounted within one end of member 44 is a pulley 46 that is composed of electrical insulating material and that rotates about a pin 48 that projects above the surface of the member 44. The pin 48 performs as a stop to limit the movement of the carriage 42. A motor 50 is rigidly mounted to the other end of member 44. A pulley 52 that is composed of insulating material is rigidly secured to the shaft 54 of the motor 50. A small diameter electrical conducting flexible cable 56 passes around the insulating pulleys 46 and 52. The ends of the cable 56 are mechanically connected to but electrically insulated from the carriage 42 at a convenient location 58. The cable 56 is electrically connected to one contact of the light source through a conductor 64. The remaining contact of the light source is electrically connected to the member 44 through a brush or slide contact that is located between the carriage 42 and the member 44. A spring contact 65 that is mechanically attached to the member 44, is electrically insulated from said member and makes electrical contact with the cable 56. Electrical energy is brought into the target mechanism through a plurality of cables 60 connected to a plug 62. One set of cables is for the operation of the motor 50 and another set of cables is for the operation of the light source wherein one conductor is connected to the spring contact 65 and the other conductor is connected to the member 44. The path of the flow of current for the operation of the light source is from one cable 60 directly to the spring contact 65, to the conducting cable 56, to one of the contacts of the light source through the conductor 64, then to the member 44 through the other contact of the light source, and finally back to cable 60. The insulating pulleys 46 and 52 prevent an electrical short circuit between the cable 56 and the member 44.

The "own" vehicle or trainee vehicle position indicator comprises a plurality of interconnected rigid arms that are pivotally coupled to a controllable linkage system. A bifurcated support 67 is rigidly connected, by any convenient means, to the base 132 of the box 2. A rigid arm 66 is pivotally connected at one end to the support 67, by the pin or shaft 68. The other end of the arm 66 is pivotally connected to the bifurcated end 74 of the rigid arm 70 by the pin or shaft 72. A flat disk 76 is connected to the other end 78 of the arm 70. Four envelopes 36 are placed at equal intervals around the perimeter of the disk 76. Each envelope contains a light source and a small opening 80 for the emission of a fine beam of light. Each envelope 36 is adjusted so that the beams of light that emanate from the light sources converge to generate a single spot of light on the rotating disk 32 when the cover 4 is in the down or closed position. By the use of four such lights, the position of the trainee or "own" vehicle will always be permitted to show on disk 32 even though the parts may be positioned at times so as to cause cross member 44 to block out light from one or more of the sources 36.

Referring to Fig. 3, wherein two of the light envelopes 36 have been deleted for clarity, a shaft 84 is rotatably mounted within a hole that is centrally located in the disk 76. A pulley 88 is rigidly connected to the end 86 of the shaft 84. A bracket 90 is rigidly connected to the other end 92 of the shaft 84. A plurality of collars 82 are pinned or sweated to the shaft 84 and substantially hide the centrally located hole in disk 76. One of the collars is located above the disk 76 and the other collar is located beneath the disk 76 to prevent relative vertical movement between the shaft 84 and the disk 76. A friction driving wheel 94 is rotated by an electric motor 96 that is mounted to the bracket 90 by some convenient means such as mounting screws. A ring 98 having a triangular or wedgeshaped cross section as shown in Fig. 4 is retained in position around the lower portion of the wheel 94 by the end 102 of the bracket 90.

Returning to Fig. 2, the shaft 72 is rigidly connected to the pulley 104 at one end and to the pulley 106 at the other end. The shaft 68 is rigidly connected to the pulley 108 and the gear 110 at its lower end. The gear 112 is rigidly connected to the upper end of shaft 68. The gear 110 engages the gear 114 that is rotated by the action of the hand wheel 20 through the shaft 116. The gear 118 engages the gear 112 and positions the pointer 22 through the action of the shaft 120. The belt 122 is driven by the pulley 108 and drives the pulley 104 through shaft 72 and pulley 106. The pulley 104 drives the pulley 88 through the belt 124. Thus the rotational displacement of the shaft 84 is determined by and is proportional to the rotational displacement of the hand wheel 20. A plurality of current carrying conductors that are not shown connect the motor 96 and the trainee or "own" position indicating lights that are within the envelopes 36 to the switch 16. A second set of conductors connects the motor 50 and the target position indicating light that is within the envelope 38, to the switch 14 from connector 62. The drive wheel 94 is rotated by the motor 96 and drives the trainee position indicator mechanism along a horizontal path. The direction of the path of travel is selected by rotating the hand wheel 20 to the desired course as indicated by the dial 24 and the pointer 22. The trainee vehicle position indicator mechanism is supported at one end by the bracket 67 and at the other end by the drive wheel 94 that makes contact with the base 132 of the box 2. The target position indicator rests upon a shelf 130 that is parallel to the base 132 and located between the top and the base 132 of the box 2. A ring 134 is attached to the base 132 and protrudes above said base to a height that is sufficient to engage the ring 98.

If the wheel 94 drives the ring 98 onto the ring 134, then a lifting action raises the wheel 94 slightly off the floor 132 and stops the advance of the trainee position indicator unit. This action prevents the unit 90 from moving beyond limits of the large ring 134 and the screen 32. Sufficient light friction will be maintained between floor 132 and wheel 94 so that the wheel will resume its travel across the floor whenever the knob 20 is moved to a new directional position. The double pivot arrangement at 68 and 72 will allow movement of lights 36 to any position within the limits of ring 134. The operation of the structure of Fig. 3 is very similar to that of the crab disclosed in the Link Patent No. 2,179,663 dated November 14, 1939.

In the operation of the present device, the instructor sets the target vehicle position indicator by manually sliding the carriage 34 to the motor end of the member 44. The complete target unit is then placed at some position on the board 130 as shown in the Fig. 2. The "own" or trainee vehicle position indicator unit 76 is then placed at some convenient location within the operating area that is inclosed by the limiting ring 134.

The cover 2 is closed and the trainee or student assumes complete control of the device. As the disk 32 that is located within the cover 4 rotates, the student observes two light spots that vary in brightness from maximum to minimum in a smooth, uniform, continuous manner six times each second. The images are facsimiles of the images that appear on an actual radar screen. The light spot that represents the target vehicle position will traverse the screen in a straight path. The student observes the target and estimates or calculates its course and speed. The student then observes the position of his own vehicle and sets a course by properly adjusting knob 20 to intercept the target at some predetermined location.

Obviously many modifications and variations of the present invention are possible in the light of the above teachings. It is therefore to be understood that within the scope of the appended claim the invention may be practiced otherwise than as specifically described.

What is claimed is:

A device of the character described comprising a rotatable disk having varying light transmitting characteristics to simulate a radar screen, a belt connected to frictionally engage the periphery of said disk, means cooperatively connected to said belt to rotate said disk at a constant predetermined speed, a removable preadjustable track located beneath said rotatable disk, a movable element connected to travel along said track, a light connected to said movable element to generate a spot of light on said rotatable disk, a motor connected to one end of said track, an insulating pulley connected to the shaft of said motor, an electrical conducting belt cooperating with the insulating pulley and the movable element to orient said movable element and to connect said light to a source of power, a second element located beneath said rotatable disk, a plurality of lights discretely placed on said second element to generate a second spot of light on said rotatable disk regardless of the position of said first mentioned track and said first mentioned movable element, a second electric motor connected to move said second element, adjustable mechanical linkage means cooperating with said second element and said second motor to orient said second spot of light, and mechanical means to indicate the direction of travel of said second element.

References Cited in the file of this patent

UNITED STATES PATENTS

| | | |
|---|---|---|
| 2,443,631 | McDermott et al. | June 22, 1948 |
| 2,491,308 | Gorton et al. | Dec. 13, 1949 |
| 2,505,094 | Bunyan | Apr. 25, 1950 |
| 2,520,924 | Fraser | Sept. 5, 1950 |
| 2,526,693 | Rust | Oct. 24, 1950 |
| 2,591,715 | Morey et al. | Apr. 8, 1952 |
| 2,633,648 | Amman | Apr. 7, 1953 |